Sept. 9, 1958 L. J. MORGAN 2,851,257
MIXING MACHINE
Filed June 15, 1954 2 Sheets-Sheet 1
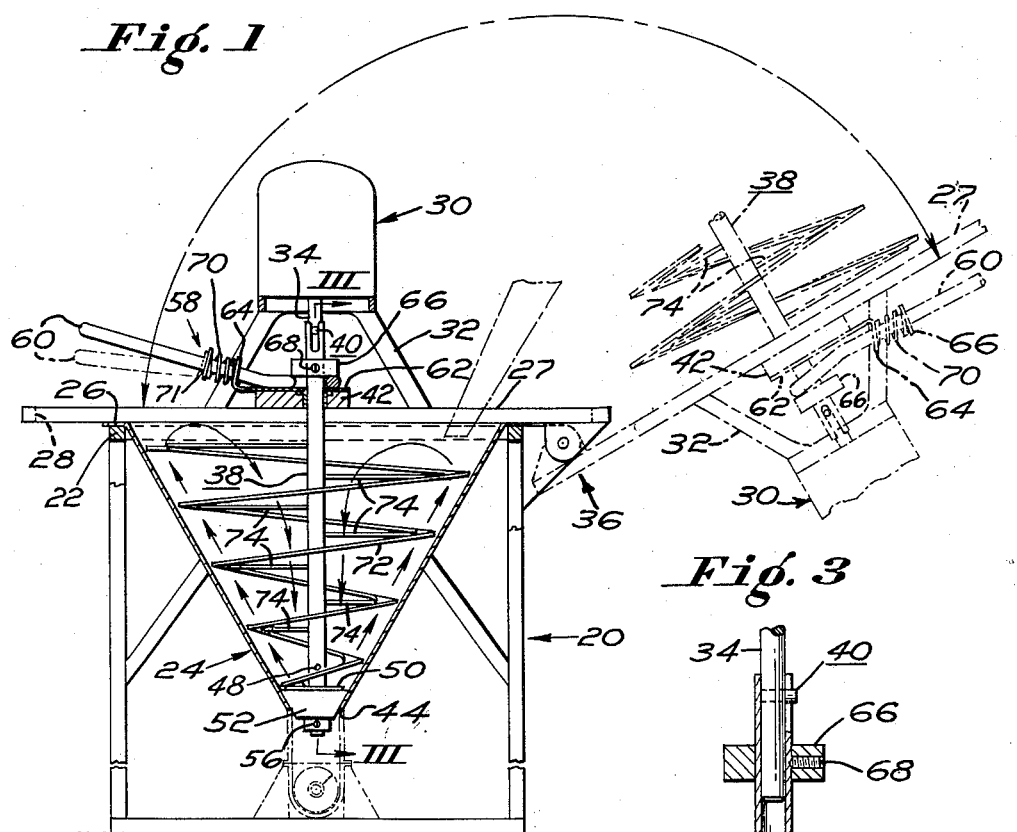
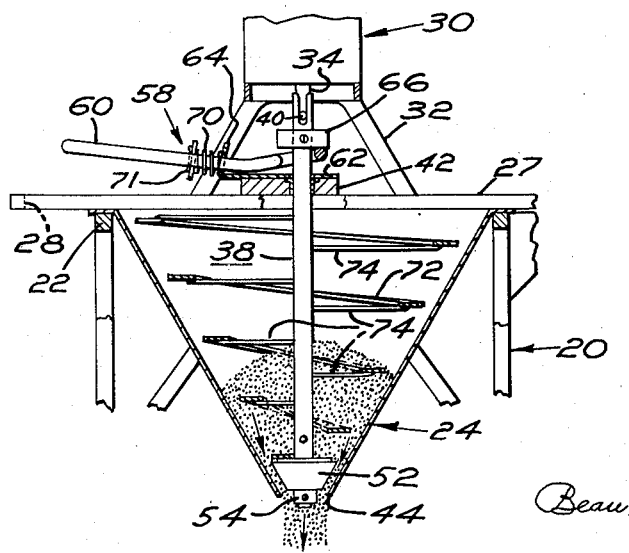
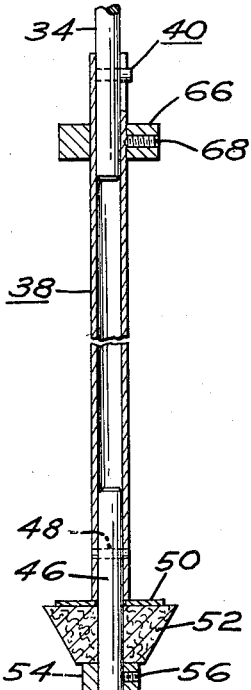
INVENTOR.
LEMUEL J. MORGAN
BY
Beau, Brooks, Buckley & Beau,
ATTORNEYS.

Sept. 9, 1958    L. J. MORGAN    2,851,257
MIXING MACHINE

Filed June 15, 1954    2 Sheets-Sheet 2

INVENTOR.
LEMUEL J. MORGAN
BY
Beau, Brooks, Buckley & Beau,
ATTORNEYS.

United States Patent Office 2,851,257
Patented Sept. 9, 1958

2,851,257

MIXING MACHINE

Lemuel J. Morgan, East Stroudsburg, Pa., assignor to The Patterson-Kelley Co., Inc., East Stroudsburg, Pa.

Application June 15, 1954, Serial No. 436,930

1 Claim. (Cl. 259—44)

The invention relates generally to improved materials mixing and blending means, and more particularly to an improved mixing device employing convolute-ribbon stirring means.

It is known in the mixing art that mixing or blending of comminuted materials is achieved by successively heaping together and then spreading the materials, and it is a primary object of the present invention to provide improved stirring means in devices of the aforesaid type, whereby materials processed thereby will be thoroughly and uniformly blended through improved and continuous alternate heaping and spreading operations.

Another object of the invention is to provide improved product discharge means in conjunction with the aforesaid stirring means.

Another object of the invention is to provide the aforesaid advantages in a mixing device having an improved hinged support for the stirring means, which is adapted to be easily swung clear of the mixing chamber so that all parts of the device will be easily accessible for cleaning and repair, or the like.

Another object of the invention is to provide a mixing device having convolute-ribbon type stirring means for thorough intermingling of miscible feed materials, by movements of the materials in upwardly helical paths adjacent and along the walls of the mixing chamber, and thence downwardly through the center of the chamber, in a continuously cycling action whereby the materials are spread radially outwardly and upwardly and circumferentially, and then heaped radially inwardly and downwardly.

Still another object of the invention is to provide in a device of the aforesaid type an improved continuously even flow pattern of materials, so as to offset the caking or stratifying tendencies of some materials, and to achieve rapid and more perfect blending thereof.

A further object of the invention is to provide an improved mixing device of the aforesaid type which may be economically manufactured and operated, and which is capable of being easily maintained in clean and sanitary condition.

Other objects and advantages of the invention will be apparent from the specification hereinafter.

In the drawings:

Fig. 1 is a side elevational view, partly in section, of a machine of the invention;

Fig. 2 is a fragmentary elevational view showing the device of Fig. 1 in material discharging condition;

Fig. 3 is an enlarged fragmentary sectional view, taken on line III—III of Fig. 1;

Figure 4:
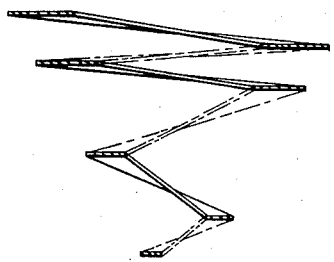

Figs. 4 to 7, inclusive, are elevational views of various forms of "ribbon" type stirring means such as may be used in connection with devices of the invention; and Figs. 8 to 12, inclusive, are elevational views illustrating various shapes of material mixing chambers such as may be used in connection with devices of the invention.

Referring now particularly to the drawing, there is illustrated in the embodiment shown in Fig. 1 a supporting framework 20 having annular support means at its upper end as indicated at 22 accommodating and supporting therein a generally hollow frustro-conical shaped material container 24 having an integral annular support flange 26. A cover member 27 having a handle portion 28 is mounted to rest on the container flange 26 and supports a motor as indicated generally at 30 by means of a pedestal framework 32 so that when the cover is closed the motor drive shaft 34 depends from the motor in axial alignment with the vertical axis of the container.

It is a feature of the invention that the cover 27 may be hinged to the supporting framework as indicated at 36, whereby in moderate size units the hereinafter described ribbon stirring means of the machine may be swung on its hinge 36 out from its operative position to an open position as shown in dotted lines in Fig. 1. A hollow shaft 38 is detachably connected at one end to the motor drive shaft 34 by means of a slot-pin interconnection as indicated at 40, and is journaled through a bearing block 42 mounted on the cover member and then extends downwardly in axial alignment with the vertical axis of the frustro-conical material container when the cover is closed, and terminates at the apex of the container where the material discharge opening 44 is provided.

A pin 46 (Fig. 3) is fitted into the bottom of the shaft 38 and is fixed thereto by means of a pin 48 (Figs. 1 and 3). Then a washer 50 and a tapered plug 52 are slipped over the bottom end of the pin 46 and secured against the lower end of the agitator shaft by a collar 54 which is retained on the pin 46 by a set screw 56.

It is noted that in assembled relation the plug member will seat in sealing relation against the inside walls of the container 24 surrounding the opening 44, and is adapted to be raised within limits as defined by the depth of the slot accommodating the pin 40 for discharge of the mixed materials from the container and/or to provide necessary clearance to permit the cover and shaft unit to be pivoted back as into the dotted line positions indicated in Fig. 1, for cleaning or repair purposes, or the like.

A handle device as indicated generally at 58 is provided for lifting the agitator shaft for the aforesaid purposes. The device 58 includes a rocker handle arm 60 bent at one end to encompass the agitator shaft and to rest on a metal plate 62 having an upturned apertured abutment flange 64 through which the handle normally extends in upwardly angular relation from its bent end portion. A collar 66 is fixed to the agitator shaft by means of a set screw 68 to provide interconnecting camming engagement between the rocker handle and the agitator shaft. A spring 70 is preferably slipped over the rocker handle to abut against the flange 64 and is held in place as by means of a cotter pin 71, or the like. Thus, it will be understood that a downward pull on the rocker handle from its "normal" position will cam the agitator shaft upwardly to open the discharge port 44 for gravity discharge of the machine contents, and that upon release of the handle the shaft and plug 52 will gravitate downwardly to cause the plug to close the container outlet 44.

It is a particular feature of the invention that a helical-ribbon type stirring means is employed, as indicated for example at 72 in the embodiment shown in Figs. 1 and 2. Thus, the stirrer may comprise a helicoidal strip of metal, or the like, having an envelope contour conforming generally to the shape of the container walls and being integrally fixed to the agitator shaft 38 as by means of a plurality of radially projecting rods 74. A helicoidal-ribbon type stirrer as shown is adapted to move quantities of materials from points to points within the container, proportional to the area of the ribbon-surface.

The container is shaped to comprise an upper portion of relatively large sectional area and a lower portion of smaller cross-sectional area; so as to be generally of some modified funnel or bowl shape. A variety of such shapes are shown for example in Figs. 8 to 12, inclusive. In any case it is to be understood that the ribbon stirring means is so shaped that the convolutions thereof preferably spiral upwardly and outwardly while being disposed adjacent the container walls. By reason of this arrangement the materials being acted upon will be moved substantially according to the patterns of flow indicated by the arrows of Fig. 1. Thus, materials from the bottom apex portion of the container will be spread and moved radially outwardly and upwardly and circumferentially along the container walls until they reach the top of the machine load when they are dumped inwardly to gravitate downwardly through the center of the stirrer. Hence alternate spreading and heaping of the material being processed is obtained, and consistently uniform mixing results may thus be achieved for successive batches of materials by controlling the rate of the agitator speed for evenly timed periods of operation.

Figure 5:
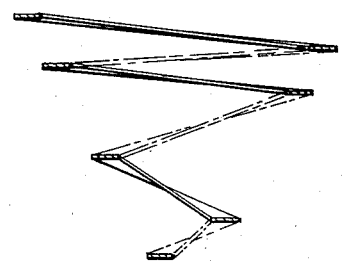
Figure 6:
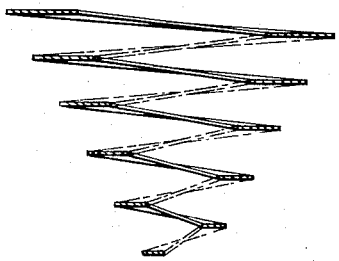
Figure 7:
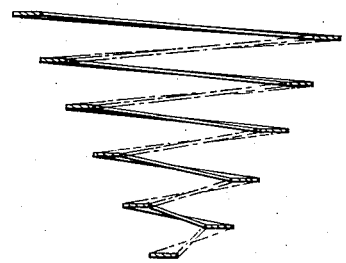
Figure 8:
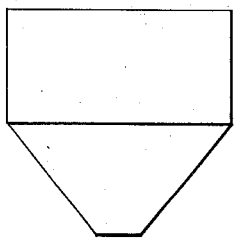
Figure 9:
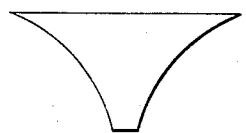
Figure 10:
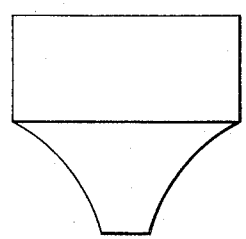
Figure 11:
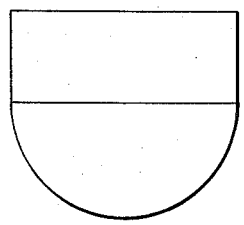
Figure 12:
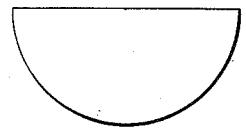

It is particularly noted as illustrated by way of example in Figs. 4 to 7, inclusive, that various forms of helical ribbon stirrers may be utilized to solve different mixing problems. Thus, the ribbon pitch may be varied as illustrated in Figs. 4 and 5, or it may be constant throughout as illustrated in Figs. 6 and 7; and the ribbon width may be varied from top to bottom as illustrated in Figs. 4 and 6, or it may be maintained constant as illustrated in Figs. 5 and 7.

It will, of course, be understood that any suitable material inlet means may be employed to feed the container, and would preferably permit charging of the container without moving the cover and motor. In any event, the material may be discharged from the container after a mixing operation by simply pressing the rocker handle downwardly to cam the outlet stop-plug 52 upwardly out of material sealing contact with the container wall surrounding the discharge port 44. In the further event that it is desired to clean or replace the container or the convoluted ribbon blender in constructions wherein the cover member 27 is hinged as aforesaid, it will only be necessary to keep the handle 60 depressed and to simultaneously grasp the cover handle 28 and lift the cover up and over into the dotted line position thereof shown in Fig. 1.

Although only one form of the invention has been shown and described in detail, it will be apparent to those skilled in the art that the invention is not so limited but that various changes may be made therein without departing from the spirit of the invention or the scope of the appended claim.

I claim:

A material mixing machine comprising a supporting framework, a cone-shaped container having an annular outwardly extending flange at the upper rim thereof and having a sectionally tapering lower portion terminating in an apex having a discharge port therein, said container being fitted into said framework and supported thereon by said flange, a cover pivoted on said framework and fitting over said container, drive means carried by said cover, an agitator shaft journaled on said cover in axial alignment with the vertical center line of said container and carrying a tapered plug at the lower end thereof adapted to seat in material-sealing engagement in said discharge port, said shaft being detachably connected at its upper end by means of an up-down lost motion connection device to said drive means, manually operable cam means for camming said agitator shaft upwardly to open said discharge port, and spiral shaped stirring means fixed to said agitator shaft to rotate therewith inwardly of said container means.

References Cited in the file of this patent

UNITED STATES PATENTS

| | | |
|---|---|---|
| 797,079 | Shepplett | Aug. 15, 1905 |
| 1,101,199 | Legg et al. | June 23, 1914 |
| 1,734,632 | Merrill | Nov. 5, 1929 |
| 2,027,756 | Tay | Jan. 14, 1936 |
| 2,295,098 | Cornell | Sept. 8, 1942 |
| 2,626,133 | Reed | Jan. 20, 1953 |

FOREIGN PATENTS

| | | |
|---|---|---|
| 292,479 | Germany | June 13, 1916 |